April 30, 1946.   E. F. POWELL ET AL   2,399,572
SEALING TUBELESS PNEUMATIC TIRE
Filed May 3, 1944
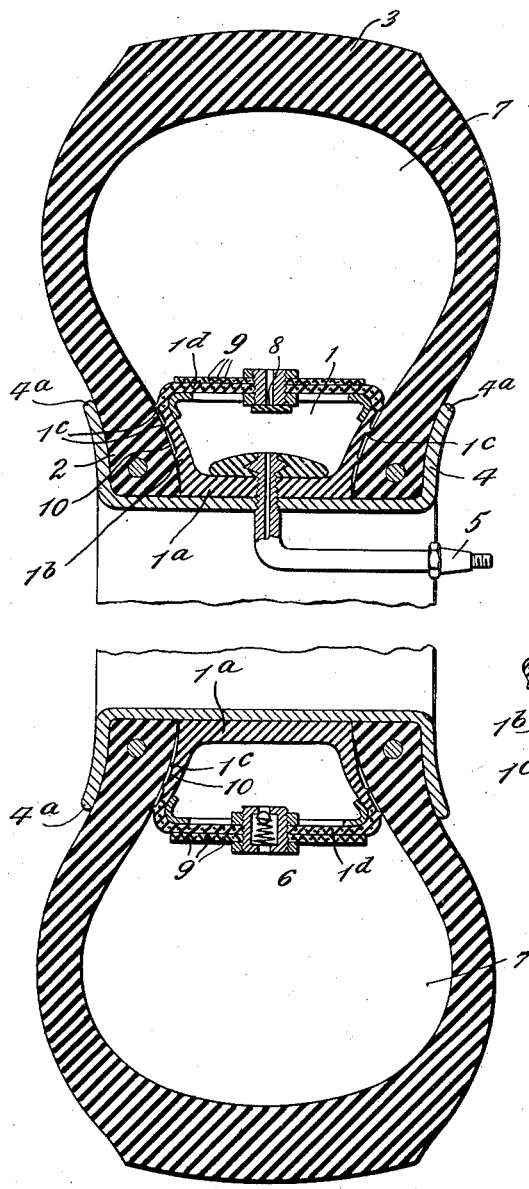
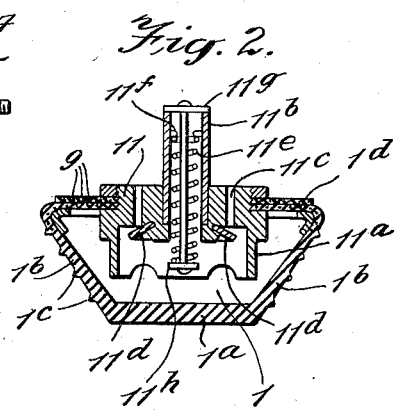
INVENTOR
Ernest Frederick Powell
Philip Walter Badham
BY
ATTORNEY

UNITED STATES PATENT OFFICE 2,399,572

SEALING TUBELESS PNEUMATIC TIRE

Ernest Frederick Powell, Wylde Green, and Philip Walter Badham, Erdington, Birmingham, England, assignors to Dunlop Rubber Company Limited, London, England, a British company Application May 3, 1944, Serial No. 533,964
In Great Britain February 2, 1943

2 Claims. (Cl. 152—400)

Our invention relates to a sealing device for a pneumatic tire enabling the latter to be inflated upon a wheel rim or hubshell without employing a separable air tube for distention into contact with the whole of the inner wall of the tire casing.

The device enables the existing cord insulating rubber of the casing to be utilised to retain the inflating medium thus effecting a reduction in the quantity and weight of tube rubber which is particularly advantageous in the case of tires of large overall dimensions and small hub diameter such as are employed on aircraft. In addition the assembly of tires fitted with the device is facilitated by elimination of the risk of tube creasing, and by reducing out of balance effects attributable to the use of a separable load supporting air tube.

According to this invention a sealing device for a tubeless pneumatic tire, comprises a four sided distensible annulus of rubber or the like of which two radially-extending sides are distensible and connected at the outer periphery of the annulus by a circumferentially inextensible wall provided with an air outlet opening and at the inner periphery of the annulus by a wall adapted to seat on the rim of the wheel and provided with an air inlet opening.

In order that the invention may be more clearly understood and readily carried into practical effect reference is made, in further describing the same, to the accompanying drawing wherein—

Fig. 1 is a part sectional view of a rim carrying a pneumatic tire cover provided with a distensible annulus constructed in accordance with the invention.

Fig. 2 is a sectional view of an alternative form of valve device for use with the annulus shown in Fig. 1.

In brief, the invention comprises an inflatable annulus 1 positioned between the beads 2 of a pneumatic tire cover 3 carried on a tire supporting rim 4. The annulus is connected at its lesser diameter to an inflation pipe 5 comprising a standard inflation valve and the greater diameter surface of the annulus is provided with a non-return valve 6 permitting air to flow from the annulus into the tire chamber 7 during inflation of the annulus and with a non-return valve 8 permitting air to flow from the tire chamber 7 into the annulus on deflation of said annulus through the pipe 5 to permit the removal of the tire cover and annulus from the rim.

The device shown in Fig. 2 illustrates an alternative form of valve device which may be substituted for the non-return valves 6 and 8 hereinbefore referred to.

Referring to Fig. 1 of the drawing, the distensible annulus 1 is of an overall diameter corresponding substantially to the overall diameter of the rim flanges 4a, said annulus having at its lesser diameter a rim seating side 1a of rubber which merges integrally on either side into radially extending bead seating sides 1b of generally concave and outwardly tapering formation adapted to register with the internal walls of the tire cover adjacent the beads 2.

The bead-seating sides 1b are provided externally with circumferentially extending ribs 1c providing pockets for the retention of coatings 10 of a plastic or adhesive nature which on inflation of the annulus 1 are compressed into self-sealing contact with the walls of the tire.

Such coatings may be formed upon the bead-seating walls of the annulus to a depth of the order of one or two millimetres and may consist for example of a mixture of whole tire reclaim, whiting, clay and other compounding ingredients known to the art.

The bead-seating sides 1b are connected together at their greater diameter by an outer peripheral side 1d which is wider than the rim seating side 1a and which is reinforced by a series of parallel and flexible threads 9 or cords which are substantially inextensible in a circumferential direction and are inter-connected laterally in contiguous relation or in spaced relation by a thin web of rubber or similar resilient material.

The outer periphery 1d of the annulus may be additionally reinforced by a band of fabric containing an additional series of reinforcing threads 9.

The threads 9 render the outer periphery 1d substantially undeformable in a radial direction so that when the annulus is inflated the internal pressure set up is caused to expand the yielding side walls 1b whereby the pockets of plastic or adhesive sealing material are compressed against the internal walls of the tire cover which are externally supported by the flanges of the rim.

In view of the limited stretch to which a tire casing is subjected as compared with that sustained on inflation by a load supporting air tube a wide selection of non-permeable coatings of limited extensibility is rendered available for sealing purposes and may consist of or comprise a substance of a permanently non-drying or tacky nature.

Air or other inflating medium is introduced into the annulus 1 through a pipe 5 provided at its free end with an inflation valve which may be of standard type or may have an aperture of reduced diameter to prevent undue pressure being exerted upon the walls of the annulus due to inflation at excessive speed.

The outer periphery of the annulus is provided with a non-return valve 6 preferably located diametrically opposite the inflation orifice corresponding to the pipe 5 in order to balance the non-return valve 8 which is preferably located directly over the inflation orifice connected to the inflation pipe 5. The non-return valve 6 may consist of a spring loaded ball which permits air to pass from the annulus 1 into the tire chamber 7 but prevents its return from the chamber into the annulus. To enable the chamber 7 to be deflated consequent upon deflation of the annulus 1 by unseating the inflation valve in the pipe 5 the peripheral wall 1d of the annulus is provided with a non-return valve 8 such as a flap valve or other known type of valve which normally prevents flow of air from the inflated annulus into the chamber 7 but permits air to flow back again when the annulus is deflated.

The non-return valves may be radially grooved at their ends within the annulus to provide air passages through which air may pass in the event of such end surfaces contacting with the rim-seating portion when the annulus is deflated.

The operation of the assembly shown in Fig. 1 is as follows: On inflating the annulus 1 through the inflation pipe 5 the inflating medium closes the non-return flap valve 8, distends the lateral walls of the annulus and forces the plastic sealing material into sealing contact with the walls of the tire beads 2.

As inflation of the annulus continues air passes therefrom through the non-return valve 6 into the chamber 7 until the pressure is built up in said chamber to the intensity required to support the tire cover under load.

The attainment of the desired pressure may be checked by applying a tire inflation gauge to the end of the inflation pipe 5, the pressure indicated being the same as that of the chamber 7 owing to the equalizing effect of the valve 8. During inflation, however, the annulus may have a somewhat higher inflation pressure than the chamber 7 due to the restricted air flow through the non-return valve 6, such restriction serving to ensure a positive seal during inflation.

The modification shown in Fig. 2 enables the separate valves 6 and 8 to be dispensed with and permits their convenient replacement by a multiple valve device adapted to ensure the maintenance of a pressure within the annulus after inflation normally exceeding by a predetermined degree the pressure in the chamber 7.

The multiple valve device shown in Fig. 2 comprises a base 11 having a skirt 11a which is recessed to permit air to pass from the interior of the annulus through a tube 11b into the chamber 7 shown in Fig. 1 formed between the tire cover and the outer periphery of the annulus.

The base 11 is provided with ports 11c which are closed during the inflation by a dished rubber disc 11d which is deformed by the rising pressure into sealing contact with the lower ends of the ports 11c. During inflation air forced up the tube 11b lifts the valve disc 11g which normally seals the end of the tube 11b. This lifting is effected against the pressure of a compression spring 11e, of which the upper end contacts with abutments 11f formed in the walls of the tube and the lower end with a disc 11h connected by a spindle to the valve disc 11g. Thus the inflation medium is only admitted to the chamber formed between the tire cover and annulus when the pressure in the annulus exceeds the pressure in such chamber by an amount equal to that required to compress the spring 11e.

The actual pressure of the chamber 7 can be gauged subsequent to inflation by applying a tire inflation gauge to the pipe 5 as previously described and deducting from the reading the known excess pressure corresponding to the spring 11e.

The operation of the invention incorporating the device shown in Fig. 2 is as follows: On inflating the annulus 1 the dished rubber valve disc 11d closes the ports 11c. Thereupon the pressure of the air confined in the annulus increases and forces the plastic material against the tire beads. Continued inflation raises the valve disc 11g and permits air to pass into the tire chamber only after overcoming the pressure of the spring 11e in addition to any pressure already in the tire chamber 7.

Deflation of the annulus and the tire chamber is effected by unseating the inflation valve mounted in the pipe 5 whereupon the fall in pressure in the annulus permits the dished rubber valve disc 11d to reassume its initial position thus uncovering the ports 11c.

The tire chamber then exhausts through such ports into the annulus and through the pipe 5 to atmosphere.

Having described our invention, what we claim is:

1. A sealing device for a tubeless pneumatic tire comprising a hollow annulus of flexible material having an inner wall to seat on the rim of a wheel and provided with an inflation opening, an outer inextensible peripheral wall spaced from said inner wall and a pair of extensible side walls connecting said inner and outer walls to fit the inner surface of the tire and valve controlled passages to enable air to flow freely through said outer wall into the interior of said hollow annulus and to flow from said interior through said outer wall under a pressure differential.

2. A sealing device for a tubeless pneumatic tire comprising a hollow annulus having an inner wall, a pair of side walls extending outwardly from said inner wall and an outer inextensible peripheral wall closing the space between said walls, said inner wall having an air inlet and said inextensible outer wall having means to enable air to pass therethrough from the interior of said annulus under a predetermined pressure differential and to flow freely reversely into said annulus.

ERNEST FREDERICK POWELL.
PHILIP WALTER BADHAM.